United States Patent
Jungmaier et al.

(10) Patent No.: US 11,360,185 B2
(45) Date of Patent: Jun. 14, 2022

(54) PHASE CODED FMCW RADAR

(71) Applicant: Infineon Technologies AG, Neubiberg (DE)

(72) Inventors: Reinhard-Wolfgang Jungmaier, Alkoven (AT); Christoph Rumpler, Munich (DE); Avik Santra, Munich (DE); Saverio Trotta, Munich (DE); Raghavendran Vagarappan Ulaganathan, Munich (DE)

(73) Assignee: Infineon Technologies AG, Neubiberg (DE)

( * ) Notice: Subject to any disclaimer, the term of this patent is extended or adjusted under 35 U.S.C. 154(b) by 349 days.

(21) Appl. No.: 16/584,404

(22) Filed: Sep. 26, 2019

(65) Prior Publication Data

US 2020/0132825 A1   Apr. 30, 2020

Related U.S. Application Data

(60) Provisional application No. 62/749,981, filed on Oct. 24, 2018.

(51) Int. Cl.
  *G01S 7/02*  (2006.01)
  *G01S 7/35*  (2006.01)
  (Continued)

(52) U.S. Cl.
  CPC ............ *G01S 7/023* (2013.01); *G01S 7/0233* (2021.05); *G01S 7/0234* (2021.05); *G01S 7/352* (2013.01);
  (Continued)

(58) Field of Classification Search
  CPC ...... G01S 13/931; G01S 13/325; G01S 13/34; G01S 13/753; G01S 13/758;
  (Continued)

(56) References Cited

U.S. PATENT DOCUMENTS 4,241,347 A    12/1980  Albanese et al.
5,191,347 A *  3/1993  Ishikawa ............... G01S 13/282
                                              342/99

(Continued)

FOREIGN PATENT DOCUMENTS

CN    1463161 A    12/2003
CN    1716695 A     1/2006
(Continued)

OTHER PUBLICATIONS

Tanis, S., "Automotive Radar Sensors and Congested Radio Spectrum: An Urban Electronic Battlefield?", Analog Dialogue 52-07, Jul. 2018, 5 pages.

(Continued)

*Primary Examiner* — Olumide Ajibade Akonai
(74) *Attorney, Agent, or Firm* — Slater Matsil, LLP

(57) ABSTRACT

In an embodiment, a method of operating a radar includes: generating a set of chirps; transmitting the set of chirps; receiving chirps corresponding to the transmitted set of chirps; using a finite state machine (FSM) to apply a phase shift to each of the transmitted chirps or each of the received chirps based on a code; and demodulating the received chirps based on the code.

30 Claims, 2 Drawing Sheets

(51) Int. Cl.
*G01S 13/32* (2006.01)
*G01S 13/34* (2006.01)

(52) U.S. Cl.
CPC ............ *G01S 13/325* (2013.01); *G01S 13/34* (2013.01); *G01S 13/343* (2013.01)

(58) Field of Classification Search
CPC .... G01S 13/288; G01S 13/343; G01S 13/584; G01S 7/282; G01S 7/352; G01S 11/02; G01S 13/345; G01S 13/84; G01S 13/347; G01S 7/285; G01S 13/36; G01S 7/032; G01S 1/74; H04B 10/613; H04B 10/50; H04B 10/60
See application file for complete search history.

(56) References Cited

U.S. PATENT DOCUMENTS

| | | | |
|---|---|---|---|
| 6,147,572 A | 11/2000 | Kaminski et al. | |
| 6,150,976 A * | 11/2000 | Cooley | G01S 7/4052 342/170 |
| 6,414,631 B1 | 7/2002 | Fujimoto | |
| 6,614,813 B1 * | 9/2003 | Dudley | G06F 1/0335 370/532 |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,886,095 B2 | 2/2018 | Pothier | |
| 9,935,065 B1 | 4/2018 | Baheti et al. | |
| 10,048,353 B2 | 8/2018 | Vogt et al. | |
| 10,396,974 B1 * | 8/2019 | Schat | H04L 25/0212 |
| 10,591,592 B2 * | 3/2020 | Mindell | G01S 13/82 |
| 2003/0179127 A1 | 9/2003 | Wienand | |
| 2003/0179131 A1 | 9/2003 | Brosche | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0347027 A1 * | 12/2015 | Lu | G06F 13/1668 711/103 |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar Y.B. et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |
| 2018/0113192 A1 * | 4/2018 | Bialer | G01S 7/282 |

(56) References Cited

U.S. PATENT DOCUMENTS

| | | | |
|---|---|---|---|
| 2019/0013814 A1* | 1/2019 | Thuries | H03H 11/20 |
| 2019/0391247 A1* | 12/2019 | Gulati | G01S 7/0232 |

FOREIGN PATENT DOCUMENTS

| | | | | |
|---|---|---|---|---|
| CN | 101490578 A | 7/2009 | | |
| CN | 101585361 A | 11/2009 | | |
| CN | 102788969 A | 11/2012 | | |
| CN | 102967854 A | 3/2013 | | |
| CN | 103529444 A | 1/2014 | | |
| CN | 203950036 U | 11/2014 | | |
| DE | 102008054570 A1 | 6/2010 | | |
| DE | 102011100907 A1 | 1/2012 | | |
| DE | 102011075725 A1 | 11/2012 | | |
| DE | 102013210256 A1 | 12/2014 | | |
| DE | 102014118063 A1 | 7/2015 | | |
| EP | 3220159 A1 * | 9/2017 | | G01S 7/2921 |
| GB | 2247799 A | 3/1992 | | |
| JP | 2001174539 A | 6/2001 | | |
| JP | 2004198312 A | 7/2004 | | |
| JP | 2006234513 A | 9/2006 | | |
| JP | 2008029025 A | 2/2008 | | |
| JP | 2008089614 A | 4/2008 | | |
| JP | 2009069124 A | 4/2009 | | |
| JP | 2011529181 A | 12/2011 | | |
| JP | 2012112861 A | 6/2012 | | |
| JP | 2013521508 A | 6/2013 | | |
| JP | 2014055957 A | 3/2014 | | |
| KR | 20090063166 A | 6/2009 | | |
| KR | 20140082815 A | 7/2014 | | |
| WO | 2002054104 A1 | 7/2002 | | |
| WO | 2007060069 A1 | 5/2007 | | |
| WO | 2010115418 A2 | 10/2010 | | |
| WO | 2013009473 A2 | 1/2013 | | |
| WO | 2016033361 A1 | 3/2016 | | |

OTHER PUBLICATIONS

Wikipedia, "Barker Code", https://en.wikipedia.org/wiki/Barker_code, Oct. 19, 2018, 3 pages.

Infineon, BGT24MTR11, "Using BGT24MTR11 in Low Power Applications", RF and Protection Devices, 24 GHz Radar, Application Note AN341, Revision: Rev. 1.0, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chui et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Wikipedia, "Monopulse Radar", https://en.wikipedia.org/wiki/Monopulse_radar, Sep. 3, 2018, 6 pages.

Wikipedia, "Phase-comparison monopulse", https://en.wikipedia.org/wiki/Phase-comparison_monopulse, Sep. 3, 2018, 3 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Dham, V., Texas Instruments, "Programming Chirp Parameters in TI Radar Devices", Application Report SWRA553—May 2017, 15 pages.

Killedar, A., "XWR1xxx Power Management Optimizations—Low Cost LC Filter Solution", Application Report, SWRA577—Oct. 2017, 19 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

(56) References Cited

OTHER PUBLICATIONS

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Chunhong, Yang et al., "The Superiority analysis of linear frequency modulation and barker code composite radar signal", IEEE Ninth International Conference on Computational Intelligence and Security, Dec. 14-15, 2013, pp. 182-184.

Wikipedia "Linear-feedback shift register", URL:http://en.wikipedia.org/w/index.php?title=Linear_feedbaok_shift_register&oldid=365970839 [retrieved on Aug. 26, 2011], Aug. 26, 2011, 8 pages.

Krizek, G., "Classical Gates and Logic Elements Seminar Lecture on Selected Chapters of Quantum Theory,, Quantum Algorithms," 2003, 19 pages.

\* cited by examiner

PHASE CODED FMCW RADAR

CROSS-REFERENCE TO RELATED APPLICATIONS

This application claims the benefit of U.S. Provisional Application No. 62/749,981, filed on Oct. 24, 2018, which application is hereby incorporated herein by reference.

TECHNICAL FIELD

The present invention relates generally to an electronic system and method, and, in particular embodiments, to a phase coded frequency-modulated continuous wave (FMCW) radar.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuitry used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method of operating a radar includes: generating a set of chirps; transmitting the set of chirps; receiving chirps corresponding to the transmitted set of chirps; using a finite state machine (FSM) to apply a phase shift to each of the transmitted chirps or each of the received chirps based on a code; and demodulating the received chirps based on the code.

In accordance with an embodiment, a radar includes: a phase-locked loop (PLL); a transmitter phase mixer coupled to the PLL; a transmitter amplifier having an input coupled to the transmitter phase mixer; a receiver phase mixer coupled to the PLL; a receiver amplifier; a receiver mixer having a first input coupled to an output of the receiver amplifier, a second input coupled to an output of the receiver phase mixer, and an output configured to generate an intermediate frequency signal; a phase code block; and a finite state machine (FSM) configured to apply a phase shift to a plurality of chirps based on a code using the transmitter phase mixer or the receiver phase mixer.

In accordance with an embodiment, a millimeter-wave radar includes: a phase-locked loop (PLL); a transmitter phase mixer coupled to the PLL; a transmitter amplifier having an input coupled to the transmitter phase mixer; a transmitter antenna coupled to an output of the transmitter amplifier; a receiver phase mixer coupled to the PLL; a receiver antenna; a receiver amplifier having an input coupled to the receiver antenna; a receiver mixer having a first input coupled to an output of the receiver amplifier, a second input coupled to an output of the receiver phase mixer, and an output configured to generate an intermediate frequency signal; a phase code block; and a finite state machine (FSM) configured to apply a phase shift to a plurality of chirps based on a code using the transmitter phase mixer or the receiver phase mixer.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a phase coded FMCW millimeter-wave radar. Embodiments of the present invention may be used in other types of radars, such as radars different than millimeter-wave radars, for example.

In an embodiment of the present invention, a millimeter-wave radar uses phase code modulation on top of FMCW to improve angular resolution. The phase spread is injected by a finite state machine (FSM) inside the millimeter-wave radar. In some embodiments, an external processor programs the FSM for a particular code, and the FSM applies the programmed phase code modulation to the FMCW signals without additional intervention from the external processor. In some embodiments, a millimeter-wave radar, therefore, may advantageously operate in an autonomous way while applying phase code modulation to FMCW signals.

Figure 1:
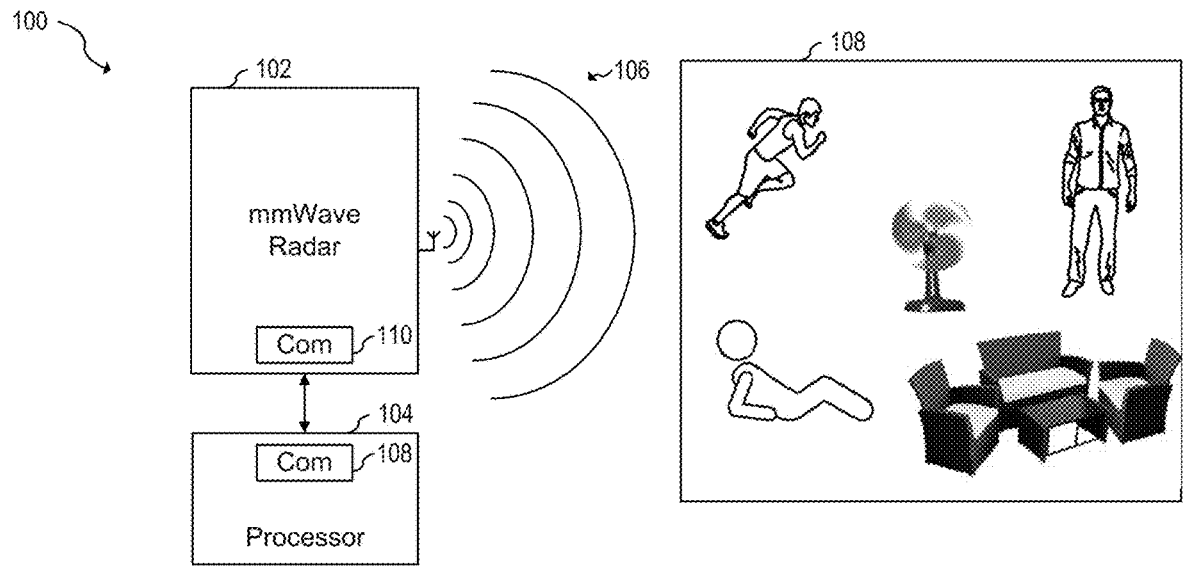
FIG. 1 shows a radar system, according to an embodiment of the present invention.

Millimeter-wave radars may be used, for example, to detect moving or static objects in a field of view. For example, FIG. 1 shows millimeter-wave radar system 100, according to an embodiment of the present invention. Millimeter wave radar system 100 includes millimeter-wave radar 102, and processor 104.

During normal operation, millimeter-wave radar 102 transmits a plurality of radiation pulses 106, such as chirps (e.g., linear chirps), towards scene 108. The transmitted radiation pulses 106 are reflected by objects in scene 108. The reflected radiation pulses (not shown in FIG. 1), which are also referred to as the echo signal, are detected by millimeter-wave radar 102 and processed by processor 104 to, for example, detect location, Doppler velocity, and other characteristics of objects in scene 108.

Millimeter-wave radar 102 operates as a frequency-modulated continuous wave (FMCW) radar or pulsed Doppler radar that includes a millimeter-wave radar sensor circuit, a transmitting antenna(s), and a receiving antenna(s). Millimeter-wave radar 102 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

In some embodiments, the echo signals received by the receiving antennas of millimeter-wave radar 102 are filtered and amplified using band-pass filter (BPFs), low-pass filter (LPFs), mixers, low-noise amplifier (LNAs), and intermediate frequency (IF) amplifiers in ways known in the art by, e.g., millimeter-wave radar 102. The echo signals are then digitized using one or more analog-to-digital converters (ADCs) for further processing, e.g., by processor 104. Other implementations are also possible.

In some embodiments, millimeter-wave radar 102 communicates with processor 104 using communication interface 110. Communication interface no may be, for example, of the serial peripheral interface (SPI), inter-integrated circuit (I²C), or universal asynchronous receiver-transmitter (UART) type. Other communication interfaces may be used.

Processor 104 may be implemented as a general purpose processor, controller or digital signal processor (DSP) that includes, for example, combinatorial circuits coupled to a memory. In some embodiments, processor 104 may be implemented with an ARM architecture, for example. In some embodiments, processor 104 may be implemented as a custom application specific integrated circuit (ASIC). In some embodiments, processor 104 includes a plurality of processors, each having one or more processing cores. In other embodiments, processor 104 includes a single processor having one or more processing cores. Other implementations are also possible. For example, some embodiments may be implemented using software running in a general purpose micro-controller or processor having, for example, a CPU coupled to a memory and implemented with an ARM or x86 architecture. Some embodiments may be implemented as a combination of hardware accelerator and software running on a DSP or general purpose micro-controller.

Millimeter-wave radars may be used to determine the location of one or more identified targets. The range component of an identified target may be determined, for example, using range FFT. The azimuth component of an identified target may be determined, for example, by determining the angle of arrival using, e.g., using a mono-pulse algorithm.

The resolution and accuracy for determining the azimuth component in an FMCW millimeter-wave radar may be optimized, for example, by adjusting the distance between receiver antennas and/or the number of channels used by the millimeter-wave radar.

In some embodiments, angular resolution is improved by using phase code modulation on top of FMCW. An FSM is used to inject a phase spread to at least a portion of the chirps in a frame during either transmission or reception of the chirps. In some embodiments, a Barker code is used as the code for generating the phase spread. By using a phase spread such as based on a Barker code, the side lobes of the radar may be reduced during post-processing (e.g., by demodulating according to the specific code), thereby helping steering a radar beam into a particular direction.

Figure 2:
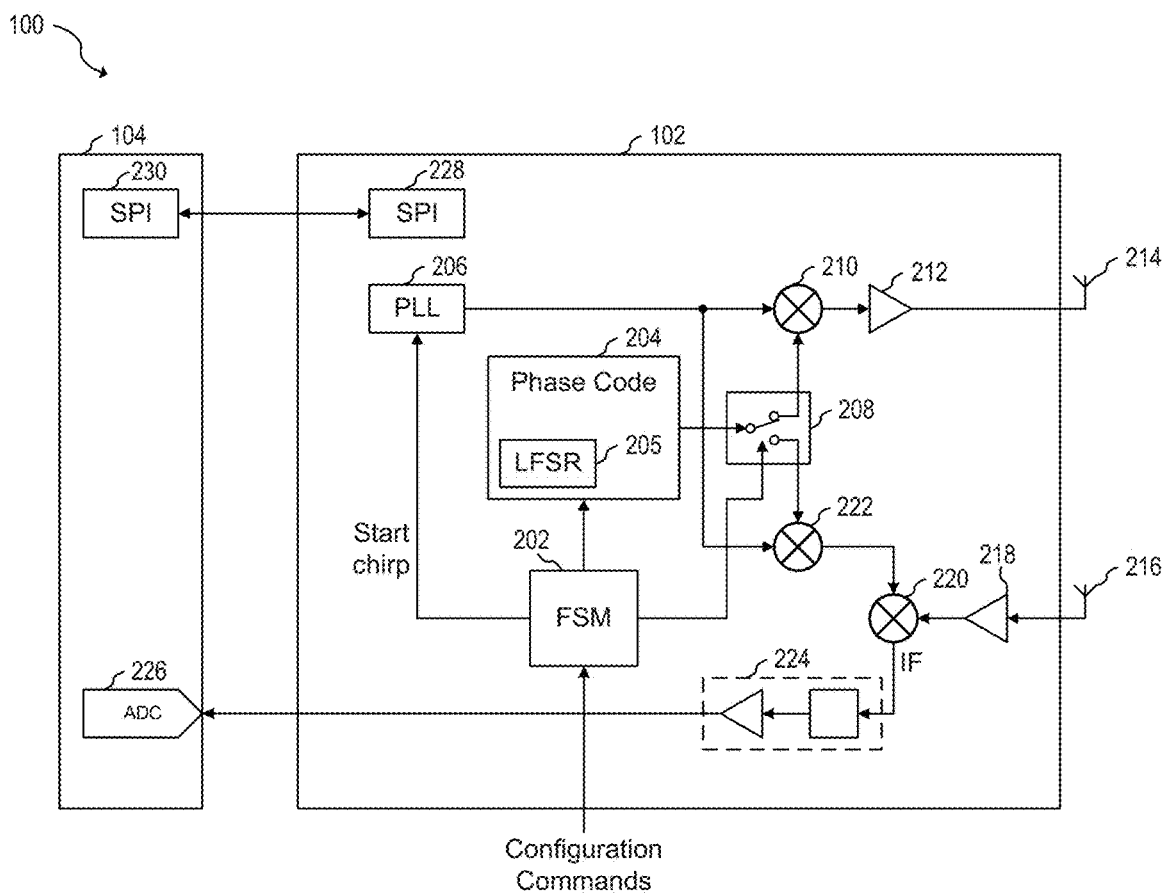
FIG. 2 shows a schematic diagram of the millimeter-wave radar system of FIG. 1, according to an embodiment of the present invention.

FIG. 2 shows a schematic diagram of millimeter-wave radar system 100, according to an embodiment of the present invention. Millimeter-wave radar 102 includes FSM 202, phase code block 204, phase-locked loop (PLL) 206, switch 208, mixers 210, 220, and 222, amplifiers 212 and 218, transmitting antenna(s) 214, receiving antenna(s) 216, baseband amplifier and filter circuit 224, and SPI 228. Processor 104 includes analog-to-digital converter (ADC) 226 and SPI 230.

During normal operation, a frame having a plurality of chirps (e.g., linear chirps) is transmitted by amplifier 212 through transmitting antenna(s) 214. The corresponding echo is received via receiving antenna(s) 216, amplified with amplifier 218, mixed into intermediate frequency IF using mixer 220, and then sampled with ADC 226 after baseband amplification and filtering using baseband amplifier and filter circuit 224. Embodiments that have a plurality of transmitting antennas 214 may have a corresponding plurality of amplifiers 212. Embodiments that have a plurality of receiving 216 may have a corresponding plurality of amplifiers 218, and a corresponding plurality of mixers 220.

Each transmitted frame includes, e.g., $2^n$ chirps, where n may be, for example, 2, 3, 4, 5, 6, 7, 8, 9, 10, or higher. A phase shift is introduced to at least some of the chirps in the frame based on a code. For example, a chirp may have a phase shift of 180° (inverted signal) or 0° (no phase shift) based on the output of phase code block 204.

FSM 202 controls which phase is applied to each chirp by controlling phase code block 204. FSM 202 also controls whether the phase shift is applied to the transmitted chirps (via mixer 210) or to the received echo (via mixer 222) by using switch 208. Demodulation is performed (e.g., by processor 104) according to the code.

In some embodiments, the code is programmed into FSM 202 by an external user (e.g., by processor 104) using a memory (e.g., registers, or non-volatile memory) associated with FSM 202. The external user may also program whether the phase spread is applied in the transmitter path (via mixer 210) or via the receiver path (via mixer 222). After the external user programming, FSM 202 runs autonomously, applying the respective phase shift (based on the programmed code) to the corresponding chirp in the frame (either on the transmitter or receiver paths).

FSM 202 may be programmed by an arbitrary code. Using codes, such as the Barker code may advantageously result in improved angular resolution. For example, in an embodiment in which there are 8 chirps per frame, an external user may program FSM 202 to use a Barker code of length 7 to the transmitter path. A Barker code of length 7 (i.e., +1; +1; +1; −1; −1; +1; −1) applies a corresponding phase shift (i.e., 0°; 0°; 0°; 180°; 180°; 0°; 180°) to 7 of the 8 chirps in the frame. The eighth chirp (which may be located at the beginning of the frame, at the end of the frame, or in between) may be either a dummy chirp, a chirp in which no phase shift is applied, or a chirp in which a round-robin phase shift is applied.

As another non-limiting example, in an embodiment in which there are 32 chirps per frame, FSM 202 may apply a Barker code of length 7 to 7 of the 32 chirps in the frame. The other 25 chirps in the frame may have no phase shift applied to. By applying phase shifts based on a Barker code to only a sub-set of the chirps in a frame, lower side lobes may be achieved without substantially raising the noise floor. In some embodiments, the length of the code may be a primary number. In other embodiments, the length of the code may be an arbitrary positive number.

In some embodiments, FSM 202 applies the same phase code to each frame. In other embodiments, FSM 202 applies a different phase code to each frame (e.g., as pre-programmed by an external user). In yet other embodiments, FSM 202 applies a phase code to some frames but not all frames in a set of frames. For example, in some embodiments, FSM 202 applies a pre-programmed phase code to the first frame in a group of eight frames, and does not apply a phase code to the sub-sequent seven frames. By applying phase coding to a sub-set of frames, lower side lobes may be advantageously achieved in the frames in which the phase code is applied, and lower noise floor may be achieved in the frames in which phase code is not applied.

Phase code block 204 may be implemented, for example, using a programmable linear-feedback shift register (LFSR) 205. For example, in embodiments that use an LFSR in phase code block 204, an external user (e.g., processor 104) programs a polynomial into the LFSR using, e.g., SPI 228. After programming, FSM 202 controls the LFSR to change the phase for each chirp according to the programmed polynomial (i.e., clocks the LFSR). Other implementations, such as using a (volatile or non-volatile) memory and pointers, may also be used.

FSM 202 may be implemented by custom logic. Some embodiments may implement FSM 202 using a controller, such as an ARM core. Other implementations are also possible.

In some embodiments, SPI 228 is used for programming FSM 202, for example. In some embodiments, FSM 202 may be pre-programmed using one-time programmable (OTP) memories. Other programming methods may be used.

Switch 208 is used to select whether to apply the phase shifts (based on the corresponding phase codes) to the transmitter path (via mixer 210) or to the receiver path (via mixer 222). In some embodiments, FSM 202 selects the path per frame, and the same path (either transmitter or receiver path) is used for the entire frame. In other embodiments, FSM 202 selects the path per chirp, or per groups of frames. The demodulation (during post-processing in, e.g., processor 104) may not be influenced by whether the phase shifts are applied to the transmitter path or the receiver path.

In some embodiments, by using a programmable/configurable FSM, millimeter-wave radar 102 advantageously allows for application of different phase spreads to different frames, and for dynamically changing such phase spreads. By dynamically changing the phase spreads (e.g., based on changes in the environment), an external user may optimize performance by, for example, applying longer Barker codes when lower side lobes are desired, or applying shorter Barker codes when a lower noise floor is desired.

Additional advantages of some embodiments include that the programmable/configurable FSM may be used for the millimeter-wave radar to autonomously mitigate interference by using phase modulation according to a pre-programmed code.

Figure 3:
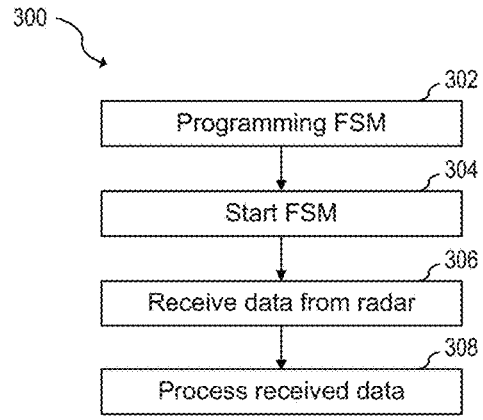
FIG. 3 illustrate a flow chart of an embodiment method of operating the radar system of FIG. 1, according to an embodiment of the present invention.
Figure 4:
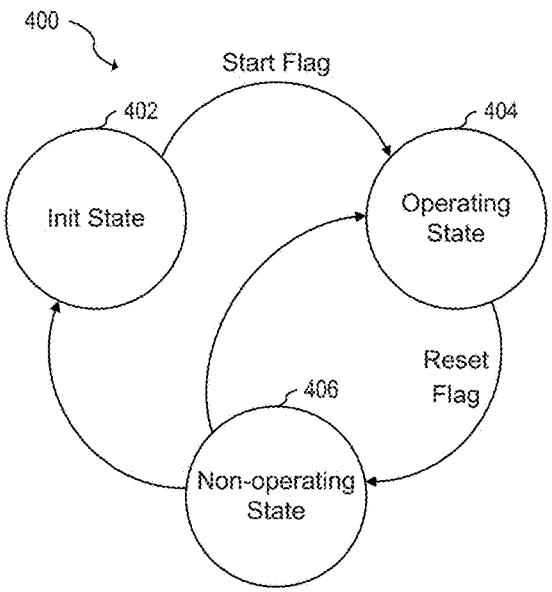
FIG. 4 illustrate a state diagram of the FSM of FIG. 2, according to an embodiment of the present invention.

FIG. 3 illustrate a flow chart of embodiment method 300 of operating radar system 100, according to an embodiment of the present invention. FIG. 4 illustrates state diagram 400 of FSM 202, according to an embodiment of the present invention. FIGS. 3 and 4 may be understood together.

During step 302, an external user, such as processor 104, programs FSM 202 according to a desired phase code. The external user may program (e.g., using configuration commands via, e.g., SPI 228), for example, one or more of: the length of the code, the type of code (e.g., Barker code), the path of application (either transmitter or receiver paths), whether to apply the same code to all frames, which code to apply to each frame, whether to apply the code in a round-robin manner, and whether to apply the code to a sub-set of the chirps in a frame. In some embodiments, programming FSM 202 includes programming phase code block 204. During step 302, FSM 202 is in initial state 402.

During step 304, a start flag is asserted (e.g., the start flag transitions from an inactive state, e.g., low, into an active state, e.g., high). Once the start flag is asserted, FSM 202 transitions into operating state 404 and causes radiation pulses, such as chirps (e.g., linear chirps), to be transmitted and received, e.g., according to the programming (during step 302). For example, before beginning transmission of chirps in a frame, FSM 202 selects whether to apply the phase code to the transmitter path or the receiver path using switch 208. FSM 202 may also initialize phase code block 204. FSM 202 then starts PLL 206 for transmission of the first chirp. The first chirp may be subjected to a phase shift based on the output of phase code block 204. After the first chirp is transmitted/received, FSM 202 selects the next code from phase code block 204 (e.g., by clocking phase code block 204), selects the state of switch 208 (if applicable), and then stars PLL 206 for transmission of the second chirp. This process continues in accordance with the pre-programing (during step 302) while FSM 202 is in operating state 404.

In some embodiments, FSM 202 operates continuously until the external user (e.g., processor 104) asserts a reset signal, which causes FSM 202 to transition into non-operating state 406. In other embodiments, FSM 202 asserts the reset flag when all of the chirps in the frame, or all the frames in the frame set have been transmitted/received. In such embodiments, FSM 202 may use an internal counter to count the number of chirps/frames transmitted and asserts the reset flag when such number reaches a threshold.

During step 306, the external user (e.g., processor 104) receives data from millimeter-wave radar 102. During step 308, the external user demodulates the received data (based on the phase code used by FSM 202).

Figure 5:
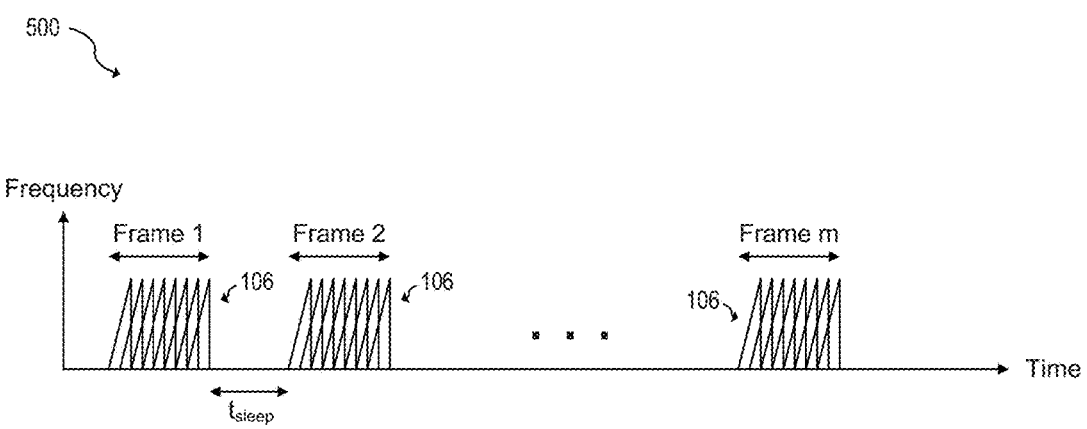
FIG. 5 shows a graph illustrating the transmission of radiation pulses by the millimeter-wave radar of FIGS. 1 and 2.

FIG. 5 shows a graph illustrating the transmission of radiation pulses by millimeter-wave radar 102. As shown in FIG. 5, frame transmissions (e.g., when FSM 202 is in the operating state 404) may be separated by sleep intervals (e.g., when FSM 202 is in the non-operating state 406). In some embodiments, FSM 202 autonomously controls the time between frames $t_{sleep}$, e.g., based on pre-programming by the external user.

Example embodiments of the present invention are summarized here. Other embodiments can also be understood from the entirety of the specification and the claims filed herein.

Example 1

A method of operating a radar, the method including: generating a set of radiation pulses; transmitting the set of radiation pulses; receiving radiation pulses corresponding to the transmitted set of radiation pulses; using a finite state machine (FSM) to apply a phase shift to each of the transmitted radiation pulses or each of the received radiation pulses based on a code; and demodulating the received radiation pulses based on the code.

Example 2

The method of example 1, where applying the phase shift based on the code includes: determining a next output of a phase code block; and applying the phase shift based on the next output.

Example 3

The method of one of examples 1 or 2, where determining the next output of the phase code block includes clocking a shift register to produce the next output at an output of the shift register.

Example 4

The method of one of examples 1 to 3, where the shift register is a linear-feedback shift register.

Example 5

The method of one of examples 1 to 4, further including programming the FSM with the code.

Example 6

The method of one of examples 1 to 5, where programming the FSM with the code includes programming a polynomial into a linear-feedback shift register.

Example 7

The method of one of examples 1 to 6, where programming the FSM with the code includes using a serial peripheral interface (SPI).

Example 8

The method of one of examples 1 to 7, further including: selecting a transmitter path using a switch coupled to a transmitter mixer; and applying the phase shift to each of the transmitted radiation pulses based on the code.

Example 9

The method of one of examples 1 to 8, further including: transmitting a plurality of frames, each frame including 2k radiation pulses, k being a positive integer greater than 1, where the set of radiation pulses includes n radiation pulses, n being a positive integer smaller than or equal to 2k; and applying the same phase shift to corresponding radiation pulses in each frame of the plurality of frames.

Example 10

The method of one of examples 1 to 9, where n is smaller than 2k.

Example 11

The method of one of examples 1 to 10, where the code is a Barker code.

Example 12

The method of one of examples 1 to 11, where the code has a length equal to a primary number.

Example 13

The method of one of examples 1 to 12, where the set of radiation pulses have n radiation pulses, n being a positive integer greater than 1, and where a frame has k radiation pulses, k being a positive integer greater than n.

Example 14

The method of one of examples 1 to 13, where applying the phase shift based on the code includes applying either 0° phase shift or 180° phase shift based on the code.

Example 15

The method of one of examples 1 to 14, where each radiation pulse of the set of radiation pulse includes a linear chirp.

Example 16

The method of one of examples 1 to 15, where the radar is a millimeter-wave radar.

Example 17

A radar including: a phase-locked loop (PLL); a transmitter phase mixer coupled to the PLL; a transmitter amplifier having an input coupled to the transmitter phase mixer; a receiver phase mixer coupled to the PLL; a receiver amplifier; a receiver mixer having a first input coupled to an output of the receiver amplifier, a second input coupled to an output of the receiver phase mixer, and an output configured to generate an intermediate frequency signal; a phase code block; and a finite state machine (FSM) configured to apply a phase shift to a plurality of radiation pulses based on a code using the transmitter phase mixer or the receiver phase mixer.

Example 18

The radar of example 17, where the phase code block includes a shift register having an output coupled to the transmitter phase mixer and the receiver phase mixer, and where the FSM is configured to clock the shift register for each radiation pulse of the plurality of radiation pulses.

Example 19

The radar of one of examples 17 or 18, where the shift register is a linear-feedback shift register.

Example 20

The radar of one of examples 17 to 19, further including a switch coupled to the transmitter phase mixer and the receiver phase mixer, and where the FSM is configured to select whether to apply the phase shift to the transmitter phase mixer or the receiver phase mixer using the switch.

Example 21

The radar of one of examples 17 to 20, further including a transmitter antenna coupled to an output of the transmitter amplifier.

Example 22

The radar of one of examples 17 to 21, further including a receiver antenna coupled to an input of the receiver amplifier.

Example 23

The radar of one of examples 17 to 22, further including a plurality of transmitter antennas coupled to an output of the transmitter amplifier.

Example 24

The radar of one of examples 17 to 23, further including a plurality of receiver antennas coupled to respective inputs of respective receiver amplifiers.

Example 25

The radar of one of examples 17 to 24, further including an amplifier and filter circuit having an input coupled to the receiver mixer and an output configured to be coupled to an analog-to-digital converter (ADC).

Example 26

A millimeter-wave radar including: a phase-locked loop (PLL); a transmitter phase mixer coupled to the PLL; a transmitter amplifier having an input coupled to the transmitter phase mixer; a transmitter antenna coupled to an output of the transmitter amplifier; a receiver phase mixer coupled to the PLL; a receiver antenna; a receiver amplifier having an input coupled to the receiver antenna; a receiver mixer having a first input coupled to an output of the receiver amplifier, a second input coupled to an output of the receiver phase mixer, and an output configured to generate an intermediate frequency signal; a phase code block; and a finite state machine (FSM) configured to apply a phase shift to a plurality of radiation pulses based on a code using the transmitter phase mixer or the receiver phase mixer.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a radar, the method comprising:
generating a set of chirps using a phase-locked loop (PLL);
transmitting the set of chirps using a transmitter phase mixer coupled to the PLL and a transmitter amplifier having an input coupled to the transmitter phase mixer;
receiving chirps corresponding to the transmitted set of chirps using a receiver amplifier having an output coupled to a receiver mixer, the receiver mixer having a first input coupled to an output of the receiver amplifier, and a second input coupled to an output of a receiver phase mixer that is coupled to the PLL;
using a finite state machine (FSM) and a phase code block to apply a phase shift to each of the transmitted chirps of the set of chirps or each of the received chirps corresponding to the transmitted set of chirps based on a code; and
demodulating the received chirps based on the code.

2. The method of claim 1, wherein applying the phase shift based on the code comprises:
determining a next output of a phase code block; and
applying the phase shift based on the next output.

3. The method of claim 2, wherein determining the next output of the phase code block comprises clocking a shift register to produce the next output at an output of the shift register.

4. The method of claim 3, wherein the shift register is a linear-feedback shift register.

5. The method of claim 1, further comprising programming the FSM with the code.

6. The method of claim 5, wherein programming the FSM with the code comprises programming a polynomial into a linear-feedback shift register.

7. The method of claim 5, wherein programming the FSM with the code comprises using a serial peripheral interface (SPI).

8. The method of claim 1, further comprising:
selecting a transmitter path using a switch coupled to a transmitter mixer; and
applying the phase shift to each of the transmitted chirps based on the code.

9. The method of claim 1, further comprising:
transmitting a plurality of frames, each frame comprising $2^k$ chirps, k being a positive integer greater than 1, wherein the set of chirps comprises n chirps, n being a positive integer smaller than or equal to $2^k$; and
applying the same phase shift to corresponding chirps in each frame of the plurality of frames.

10. The method of claim 9, wherein n is smaller than $2^k$.

11. The method of claim 1, wherein the code is a Barker code.

12. The method of claim 1, wherein the code has a length equal to a primary number.

13. The method of claim 1, wherein the set of chirps have n chirps, n being a positive integer greater than 1, and wherein a frame has k chirps, k being a positive integer greater than n.

14. The method of claim 13, wherein applying a phase shift to each of the transmitted chirps of the set of chirps or each of the received chirps corresponding to the transmitted set of chirps based on the code comprises applying a phase shift to each of the transmitted chirps of the set of n chirps or each of the received chirps corresponding to the transmitted set of n chirps based on the code without applying a phase shift to the other k-n chirps of the transmitted chirps in a frame.

15. The method of claim 14, wherein the other k-n chirps of the transmitted chirps in the frame are located at the end of the frame.

16. The method of claim 13, wherein applying a phase shift to each of the transmitted chirps of the set of chirps or each of the received chirps corresponding to the transmitted set of chirps based on the code comprises applying a phase shift to each of the transmitted chirps of the set of n chirps or each of the received chirps corresponding to the transmitted set of n chirps based on the code, the method further comprising applying a round-robin phase shift to a chirp of the other k-n chirps of the transmitted chirps in a frame.

17. The method of claim 1, wherein applying the phase shift based on the code comprises applying either 0° phase shift or 180° phase shift based on the code.

18. The method of claim 1, wherein each chirp of the set of chirps comprises a linear chirp.

19. The method of claim 1, wherein the radar is a millimeter-wave radar.

20. The method of claim 1, wherein a length of the code is a primary number.

21. A radar comprising:
a phase-locked loop (PLL);
a transmitter phase mixer coupled to the PLL;
a transmitter amplifier having an input coupled to the transmitter phase mixer;
a receiver phase mixer coupled to the PLL;
a receiver amplifier;
a receiver mixer having a first input coupled to an output of the receiver amplifier, a second input coupled to an output of the receiver phase mixer, and an output configured to generate an intermediate frequency signal;
a phase code block; and
a finite state machine (FSM) configured to apply a phase shift to a plurality of chirps based on a code using the transmitter phase mixer or the receiver phase mixer.

22. The radar of claim 21, wherein the phase code block comprises a shift register having an output coupled to the transmitter phase mixer and the receiver phase mixer, and wherein the FSM is configured to clock the shift register for each chirp of the plurality of chirps.

23. The radar of claim 22, wherein the shift register is a linear-feedback shift register.

24. The radar of claim 21, further comprising a switch coupled to the transmitter phase mixer and the receiver phase mixer, and wherein the FSM is configured to select whether to apply the phase shift to the transmitter phase mixer or the receiver phase mixer using the switch.

25. The radar of claim 21, further comprising a transmitter antenna coupled to an output of the transmitter amplifier.

26. The radar of claim 21, further comprising a receiver antenna coupled to an input of the receiver amplifier.

27. The radar of claim 21, further comprising a plurality of transmitter antennas coupled to an output of the transmitter amplifier.

28. The radar of claim 21, further comprising a plurality of receiver antennas coupled to respective inputs of respective receiver amplifiers.

29. The radar of claim 21, further comprising an amplifier and filter circuit having an input coupled to the receiver mixer and an output configured to be coupled to an analog-to-digital converter (ADC).

30. A millimeter-wave radar comprising:
a phase-locked loop (PLL);
a transmitter phase mixer coupled to the PLL;
a transmitter amplifier having an input coupled to the transmitter phase mixer;
a transmitter antenna coupled to an output of the transmitter amplifier;
a receiver phase mixer coupled to the PLL;
a receiver antenna;
a receiver amplifier having an input coupled to the receiver antenna;
a receiver mixer having a first input coupled to an output of the receiver amplifier, a second input coupled to an output of the receiver phase mixer, and an output configured to generate an intermediate frequency signal;
a phase code block; and
a finite state machine (FSM) configured to apply a phase shift to a plurality of chirps based on a code using the transmitter phase mixer or the receiver phase mixer.

* * * * *